United States Patent [19]
Ray et al.

[11] 3,963,961
[45] June 15, 1976

[54] CATHODE RAY TUBE PHOSPHOR PROTECTION CIRCUIT

[75] Inventors: Thomas J. Ray, Yonkers, N.Y.;
Glenn C. Waehner, Riverside, Conn.

[73] Assignee: United Technologies Corporation, Hartford, Conn.

[22] Filed: Dec. 23, 1974

[21] Appl. No.: 536,042

[52] U.S. Cl. .................................. 315/381; 315/384
[51] Int. Cl.² .......................................... H01J 29/52
[58] Field of Search ........... 315/379, 380, 381, 384; 358/74; 328/259

[56] References Cited
UNITED STATES PATENTS

| | | |
|---|---|---|
| 3,437,872 | 4/1969 | Henderson et al .................. 315/380 |
| 3,810,024 | 5/1974 | Meacham ............................... 328/8 |
| 3,811,068 | 5/1974 | Curry, Jr ................................ 315/20 |

Primary Examiner—Maynard R. Wilbur
Assistant Examiner—T. M. Blum
Attorney, Agent, or Firm—Dominic J. Chiantera

[57] ABSTRACT

The phosphor screen of a cathode ray tube (CRT) has its phosphor coating protected against damage caused by a stationary or low sweep velocity electron beam that strikes its surface, by removal of the video signal that controls the beam whenever there is a simultaneous presence of video signal and absence of a proper horizontal or vertical sweep signal.

4 Claims, 3 Drawing Figures

CATHODE RAY TUBE PHOSPHOR PROTECTION CIRCUIT

BACKGROUND OF THE INVENTION

1. Field of Invention

This invention relates to the protection of a CRT phosphor screen from damage caused by an impinging electron beam which is stationary, or which has a low sweep velocity, and more particularly to the high speed detection of low velocity horizontal and vertical sweep signals during the period of time in which a video signal is present at the CRT.

2. Description of the Prior Art

It is well known that the phosphor screen of a CRT is highly sensitive to electrons which impinge its surface in the form of a beam, and that the CRT is subject to the failure of having the phosphor coating damaged in the area contiguous to the point on which the electron beam strikes the coating if the electron beam is allowed to remain stationary at that location for a period of time, of from 10 to 100 microseconds, depending upon the degree of electron sensitivity of the coating, or if the beam traverses the screen at a low sweep velocity. Since a stationary, or low sweep velocity beam is due to a failure of the beams horizontal and vertical sweep positioning signals, numerous prior art protection circuits have been devised which monitor the sweep signals, or the intensity of the video signal, or both, and remove the electron beam when a failure is detected.

One such method is described in the patent to Henderson et al, U.S. Pat. No. 3,437,872, wherein a means for independently monitoring the velocity of the horizontal and vertical sweep signals, and a separate means for monitoring the intensity of the video signal are used to detect independent failures of these three parameters, such that any one failure is sufficient to remove the video signal from the CRT. This method has severe disadvantages in CRT displays incorporating the stroke-write method of displaying alpha-numeric characters, wherein each character is displayed by displaying series of stroke vectors separated by interim wait periods at the completion of each vector during which the beam sweep signals are stationary and the beam is allowed to settle out, and by periods in which the video signal is removed while the beam is repositioned to a new location on the face of the CRT. The interim periods in which the beam sweep signals are stationary would be detected as failures in this protection circuit unless the means used for monitoring the sweep signals is designed to disregard these periods, such as by delaying the detection of the presence of the sweep signals. The magnitude of the time delay must be larger than that of the worst case summation of all successive time periods in which the sweep signals may be stationary in normal operation. In a stroke-write display system, the time delay would therefore have to account for the beam deflection time, wherein the beam is changing angular position, the settling time required after the beam is repositioned to a new location, and the period of time required for writing periods at the end of a sentence of text: this total time is typically in the order of 50 microseconds, which far exceeds the minimum ten microseconds time that may be tolerated before damage occurs in high sensitivity phosphor coatings. Therefore, this protection circuit would be inadequate to protect a high sensitivity phosphor coating in a stroke-write vector display system.

In a patent to R. G. Curry, Jr., U.S. Pat. No. 3,811,068, a phosphor protection circuit, which monitors the presence of sweep signals, is implemented with logic circuitry. Therein, the protection circuit essentially compares the presence of a sweep voltage signal with a coincident presence of an unblank signal (the presence of an unblank signal allows the video signal to be displayed on the face of a CRT), and the failure of the sweep signal during the period in which an unblank signal is present is used to trigger a bistable latching means whose output is received by a suitable blanking circuit, not disclosed. This method eliminates the need for the extended analog time constant as described hereinbefore, however a failure cannot be detected in less time than that equivalent to one sweep period, which depending upon the frequency of the display may be protracted and therefore insufficient to ensure protection within the minimum ten microsecond period.

A patent to J. H. Meacham, U.S. Pat. No. 3,810,024, describes another protection circuit using logic circuitry which again compares the presence of sweep signals with the simultaneous non-appearance of a blanking signal (unblank signal), to detect failures of the sweeping circuit. The improvement described therein relates to the ability of the protection circuit to detect failures and remove the video signal within a time equivalent to one-half of the sweep period, rather than the full sweep period time required by the prior art. This however, still results in a dependency upon the frequency of the sweep signals, and the failure detection may not occur for an extended period of time.

In summary, the prior art protection circuits do not provide adequate protection against burn out of high sensitivity phosphor coatings, such as those used in stroke-write vector display systems.

SUMMARY OF INVENTION

The object of the present invention is improved protection of a CRT phosphor screen from damage of the phosphor coating caused by a stationary or low sweep velocity electron beam which strikes the screen.

According to the present invention, the video signal which controls the intensity of the electron beam is presented to the CRT through a gated video amplifier, which transmits the video signal to the CRT during the presence of a gating signal at its gate input. The gating signal originates at the output of a detection circuit, which monitors the presence of a signal at the video source and detects the presence of a proper sweep velocity signal at the outputs of the horizontal and vertical sweep amplifiers, and which removes the gating signal only in response to the appearance of a video signal in the absence of a proper velocity sweep signal. In still further accord with the present invention, a detected failure of the sweep signals is remembered by the detection circuit, which prevents any subsequent video signals from being transmitted to the CRT until the sweep failure is remedied. With the restoration of a normal sweep signal, the detection circuit automatically resets, generating a gate signal, and allowing the display of subsequent video signals. In still further accordance with the present invention, the detection circuit provides a time delay before removal of the gating signal to ensure that the absence of a proper sweep signal is the result of failure in the sweep circuits and not the result of sweep detection delays, thereby allowing the leading edge display of all stroke vectors in a strokewrite system. The maximum duration of the time delay is less than ten microseconds (the minimum time required for damage of the phosphor by the electron beam), but long enough to allow low pass filtering of the detected sweep signals in addition to the delays created by normal interruptions.

The invention provides a protection circuit which detects sweep signal failures within ten microseconds to provide protection for the most sensitive phosphor coatings, in addition to allowing low pass filtering of the detected sweep signals to prevent erroneous failure indications due to noise, while permitting the leading edge display of all video signals. The invention is capable of being implemented in a variety of forms, utilizing both analog and digital technology which is readily available in the art.

Other objects, features and advantages of the present invention will become more apparent in the light of the following detailed description of preferred embodiments thereof, as illustrated in the accompanying drawings.

DESCRIPTION OF THE PREFERRED EMBODIMENT

In the well known stroke-write method of displaying alpha-numeric symbols on the face of a cathode ray tube (CRT), a series of stroke vectors connected by interim wait periods is used to generate each alpha-numeric character. The stroke vector and wait period are generated by a symbol generator which controls the period of time in which the video, horizontal sweep, and vertical sweep signals are presented to the CRT.

Figure 3:
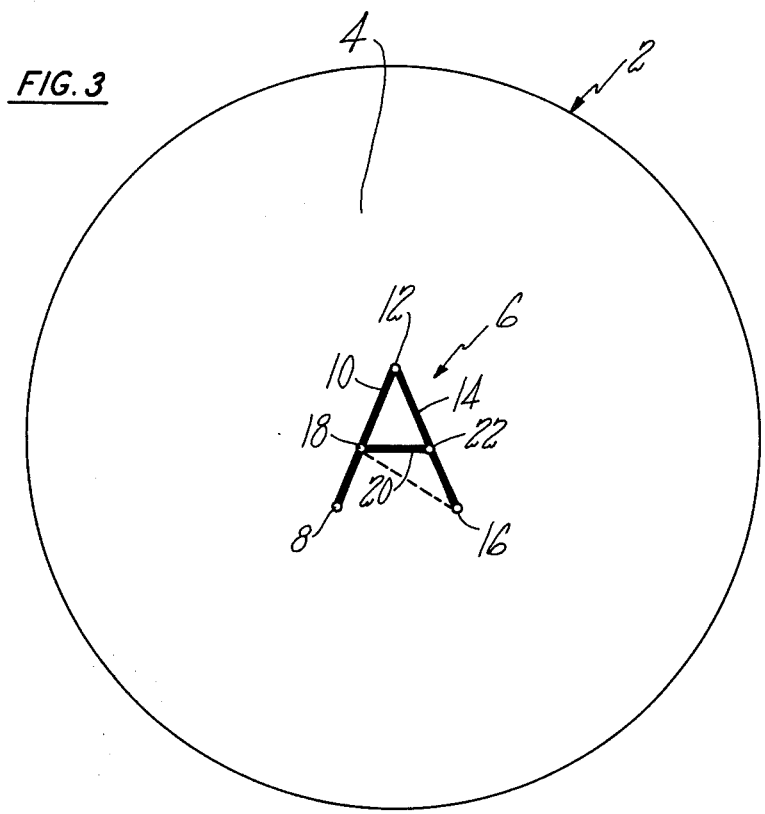
FIG. 3 is a simplified illustration of the face of a CRT, depicting display of a character by the stroke-write method.

Referring first to FIG. 3, which is a simplified illustration of the face 2 and phosphor coating 4 of a CRT on which the character A is displayed. At the initialization of the character display, the leading edge 8 of a stroke vector 10 is displayed, and the combined horizontal and vertical sweeps cause the stroke vector 10 to traverse a path to a point 12 where the video signal is removed and the sweep signals held constant, allowing the beam to remain stationary while it settles out. At the end of the predetermined settling time, the symbol generator will again turn on the video and sweep signals causing a stroke vector 14 to trace a path from the point 12 to a point 16 where video is removed and the beam is held stationary, allowing for a second settling period. After the second settling period, the symbol generator will generate the sweep signals but not video signal, allowing the beam to reposition from the point 16 to a point 18 where the sweep signals will be removed during a third settling period after which both video and sweep signals are again turned on, and a stroke vector 20 is displayed as it traverses a path from the point 18 to a point 22. At the point 22 the beam is again allowed to settle while both the video and sweep signals are removed, after which the sweep signals alone are generated and the beam repositions to the starting point of a subsequent character, where a similar process, as described hereinbefore, is repeated for the second character.

In fast stroke-write display systems, the phosphor coating 4 is highly sensitive to the impinging electrons to ensure an adequate intensity of the displayed characters. Therefore, a failure of the horizontal or vertical sweep signals which allows the electron beam to remain stationary at one point on the phosphor coating for a period of time longer than about 10 microseconds results in damage to the phosphor in the area contiguous to the point at which the electrons strike the coating. A phosphor protection circuit which is used to prevent such damage in a stroke-write display, or other similar displays, must have characteristics which will: remove the video signal in less time than that required for phosphor damage when a failure in the sweep signal has occurred, differentiate between an actual failure of the sweep signals and the constant sweep signals applied during one of the settling periods, and allow a fast response time to ensure the leading edge display of all stroke vectors while not allowing high frequency sweep signal noise to cause a false indication of sweep signals. The phosphor protection circuit of the present invention, described hereinbelow, embodies all of these characteristics.

Figure 1:
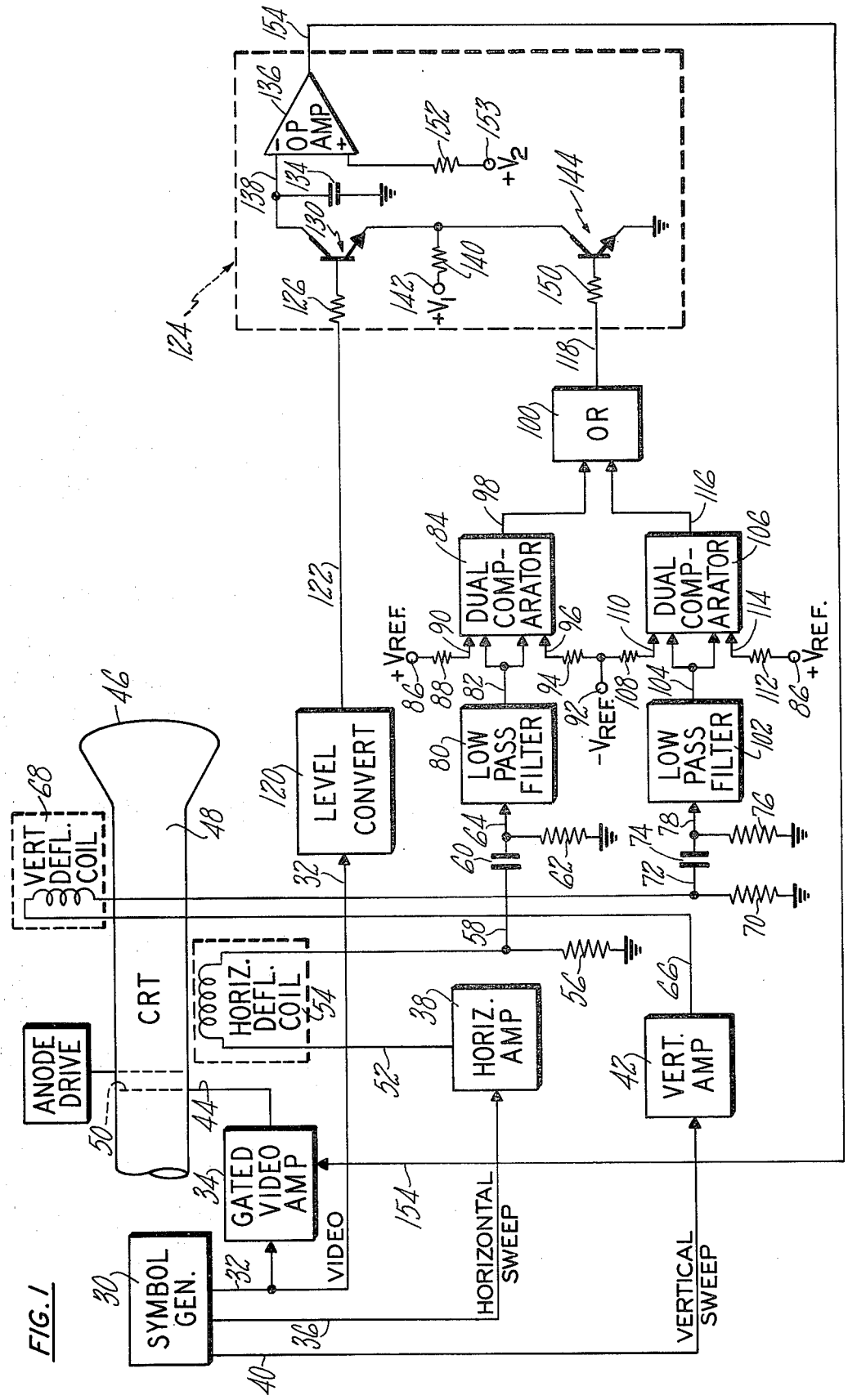
FIG. 1 is a schematic diagram of an exemplary embodiment of the invention as used in conjunction with a typical display system.

Referring now to FIG. 1, in an exemplary embodiment of a phosphor protection circuit according to the present invention, a symbol generator 30 generates outputs comprising: a video signal on a line 32 which is applied to a gated video amplifier 34, a horizontal sweep signal on a line 36 applied to a horizontal amplifier 38, and a vertical sweep signal on a line 40 applied to a vertical amplifier 42. The video amplifier 34 provides a signal on a line 44 to control the display of the video signal on the face 46 of a CRT 48 by controlling the bias on the CRT control grid 50 (this representing one of many methods for controlling the CRT video signal as may be known to those skilled in the art). The horizontal amplifier 38 generates a current signal on a line 52 which flows through a horizontal deflection coil 54 and a resistor 56 to ground and generates a voltage signal on a line 58 whose magnitude it is proportional to the current through the horizontal deflection coil. The signal is in the form of a ramp signal of voltage versus time, which is differentiated by the combination of a capacitor 60 and a resistor 62 to generate a DC signal on a line 64 which is directly proportional to the rate of change of the horizontal sweep signal with time, and therefore to the velocity of the sweep signal. In a similar manner, the vertical amplifier 42 generates a current on a line 66 which flows through a vertical deflection coil 68 and a resistor 70 to ground, creating a similar ramp signal on a line 72 which is differentiated by the combination of a capacitor 74 and a resistor 76 to generate a DC signal on a line 78 which is directly proportional to the rate of change of the vertical sweep voltage with time. The signal on the line 64 is filtered by a low pass filter 80, which eliminates any high frequency noise present on the horizontal sweep, and the signal appearing on a line 82 is a filtered DC signal which is proportional to the velocity of the horizontal sweep, and which may either be positive or negative corresponding to horizontal sweeps in the positive and negative direction. The signal on the line 82 is received by a comparing means 84, of a type well known to the state of the art such as a μA711 dual comparator made by Fairchild Semiconductor. The comparator 84 functions as a window comparator, comparing the magnitude of the signal on the line 82 to predetermined positive and negative threshold levels which define the minimum velocity of a normal sweep. The positive threshold is provided by a positive voltage source 86 connected through a resistor 88 and a line 90 to the comparator, and the negative threshold is provided by a reference voltage source 92 connected through a resistor 94 and a line 96 to the comparator. A signal on the line 82 whose magnitude is above that of the threshold magitude causes the comparator 84 to generate a logic high signal on a line 98, received by an OR gate 100. The DC signal on the line 78, which is proportional to the vertical sweep velocity, is treated in an indentical manner, being filtered by a low pass filter 102 and presented on a line 104 to a dual comparator 106, which also receives the negative threshold reference from the source 92 connected through a resistor 108 and a line 110 and the positive threshold reference from the source 86 connected through a resistor 112 and a line 114. When the magnitude of the signal on the line 104 exceeds that of either the positive or negative threshold, the comparator 106 provides a logic high signal over a line 116 to the OR gate 100. If a horizontal or vertical sweep is not generated, or if the velocity of such sweeps is below that of the minimum threshold levels, a logic low is generated on the lines 98, 116 respectively. A logic high signal on either lines 98 or 116, cause the OR gate 100 to generate an enable signal (a logic high) on a line 118, indicating the presence of either or both of the horizontal and vertical sweep signals. The video signal on the line 32, received by the gated video amplifier 34, is also received by a voltage level translator 120 which translates the analog signal into a logic-compatible signal on a line 122, and indicates a logic high when the video signal appears on the line 36 and a logic low at all other times. The signal on the line 122 is presented to a detection circuit 124, where it is connected through a resistor 126 to the base of a NPN transistor 130. The collector of the transistor 130 is connected by a line 138 to the ungrounded side of a capacitor 134 and to the inverting input of an operational amplifier (OP AMP) 136. The emitter of the transistor 130 is connected through a resistor 140 to a positive reference voltage source 142, and to the collector of an NPN transistor 144 whose emitter is connected to ground, and whose base is connected through a resistor 150 to the line 118. The noninverting input of the OP AMP 136 is connected through a resistor 152 to a positive reference voltage source 153, with its output on line 154 connected to the gate signal input of the gated video amplifier 34.

In operation, the initialization of the stroke vector display causes the simultaneous appearance of a video signal on the line 32 and horizontal and/or vertical sweep signals on the lines 36, 40. The gating signal on the line 154 is normally positive, gating the video amplifier 34 so that the appearance of the video signal on the line 32 results in a positive analog signal on the line 44, biasing the control grid 50 of the CRT 48 and allowing the electron beam to strike the phosphor coating 46, which in conjunction with the simultaneous appearance of CRT sweep signals on the lines 52, 66 allow the display of the leading edge of the stroke vector. The video signal on the line 32 presents a logic one signal with a typical amplitude of +4 volts on the line 122 which is presented to the base of the transistor 130. The appearance of the enable signal on the line 118 is delayed due to the time constants associated with the differentiating and filtering of the sweep signals as described hereinbefore, causing the transistor 144 to be turned off and further causing the positive reference voltage 142 to be presented to the emitter of the transistor 150 through the resistor 140. The positive reference voltage 142 has a typical amplitude of +5 volts DC, which in conjunction with the +4 volts appearing on the line 122 back biases the base to emitter junction of the transistor 130, prohibiting current flow through this junction. This results in the transistor 130 operating in an open emitter configuration, which causes the base to collector junction to function as a simple diode with the base of the transistor representing the anode of the diode, and the collector of the transistor representing the cathode of the diode. The +4 volt signal on the line 122 causes current flow through the resistor 126, the base to collector junction of the transistor 130, and the capacitor 134 (due to the high input impedance of the OP AMP 136 the current flowing into its inverting input is negligible), causing the voltage across the capacitor 134 to charge positively in an exponential manner with a charging time constant being approximately equal to the product of the values of the resistor 126 and the capacitor 134 (the impedance of the forward biased base to collector junction is negligible compared to the value of the resistor 126, and can be ignored). The magnitude of the positive reference voltage 153 is equal to the magnitude of the voltage appearing across the capacitor 134 at the end of one charging time constant, causing the non-inverting input of OP AMP 136 to remain more positive than the inverting input for a period of time equal to one charging time constant, allowing the output of OP AMP 136 on the line 154 to remain positive and causing the gated video amplifier 34 to remain on. If within one time constant, a logic high signal of a typical amplitude of +4 volts appears on the line 118, the transistor 144 will turn on, grounding the emitter of the transistor 130. With +4 volts on the line 122 and the emitter grounded, the base to emitter junction of the transistor 130 is forward biased allowing current to flow through this junction, permitting the transistor to turn on in the normal manner and causing the discharge of the capacitor 134 to a level equivalent to the sum of the collector to emitter saturation voltages of the transistors 130, 144. With the discharge of the capacitor 134 prior to the end of one charging time constant, the OP AMP 136 cannot change states and its output signal on the line 154 remains positive, permitting the gated video amplifier 34 to remain on and allowing the complete stroke vector to be displayed. If, due to failure of the sweep signals, the enable signal on the line 118 fails to appear within one charging time constant, the OP AMP 136 cuts off the gating signal: the transistor 144 remains off and the capacitor 134 continues to charge to its positive steady state value, approximately equal to that of the voltage on the line 122, causing the inverting input of the OP AMP 136 to be more positive than the non-inverting input so that the signal on its output line 154 switches to a negative voltage. This inhibits the gate of the gated video amplfier 34, turning it off and prohibiting further video signals from appearing on the line 44. Thereafter, the OP AMP 136 maintains its negative output on the line 154 which prohibits any further video displays by the CRT 48. In the event of sweep failure, therefore, a video signal will be displayed for a period of time approximately equal to the charging time constant of the capacitor 134, which is limited to a value less than the minimum time required for video damage of the phosphor screen. It should also be noted, that any subsequent video signals appearing on line 32 which are not accompanied by proper velocity signals on the lines 36, 40, cannot cause even temporary video displays due to the continual negative signal on the line 154 which causes the gated video amplifier to remain off. In this manner, the protection circuit remembers prior failures, and limits any potentially destructive video signal to a display time equivalent to one charging time constant. Since this time constant is the product of the values of the resistor 126 and the capacitor 124, the values of these components are chosen to ensure that the charging circuit time constant together with its associated tolerances, is much smaller than the minimum time of about ten microseconds required for a video signal to cause damage to the phosphor coating 46, the value of the time constant typically being in the range of two to four microseconds.

Since the symbol generator 30 may cause a failure of the sweep signals to occur in the generation of only one stroke vector, normal operation may be present for a subsequent vector. The initialization of the subsequent normal stroke vector, following a previously detected failure, results in the simultaneous appearance of a video signal on the line 32, a +4 volt signal on the line 122, and the appropriate sweep signals on the lines 36, 40. The positive steady state charge on the capacitor 134 causes the signal on the line 154 to remain at a negative value which inhibits the video amplifier 34 resulting in a zero video signal on the line 44, while appropriate sweep signals are transmitted to the CRT on the lines 52, 66. This results in the loss of the leading edge display of the stroke vector; however, after the appearance of the delayed logic high signal on the line 118, the capacitor 134 is discharged as described hereinbefore, allowing the signal on the line 154 to become positive, turning on the gated video amplifier 34, and allowing the display of the remaining portion of the video signal. The loss of the leading edge display will occur only for those stroke vectors which immediately follow a detected failure with the leading edge of all subsequent normal vectors being displayed.

Figure 2:
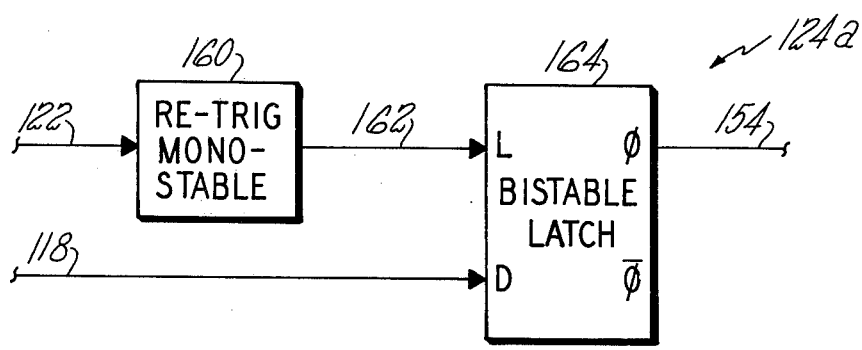
FIG. 2 is a partial schematic diagram of an alternative embodiment of a portion of the invention.

The function of the detector circuit 124 may also be implemented through the use of logic circuitry as shown by the detector circuit 124a of FIG. 2. Referring now to FIG. 2, the line 122 which contains the discrete video signal is connected to a retriggerable monostable multivibrator 160 of a type well known to the state of the art, such as a Raytheon RG80, which generates a discrete logic ONE on the line 162 which is delayed by a predetermined period of time approximately equal to the charging time constant of the detector circuit 124 of FIG. 1. The delayed signal on the line 162 is applied to the clocking input (L) of a latching means 164 of a type well known to the state of the art, such as the Texas Instrument bistable latch SN7477, which receives at its state-controlling input (D) the enable signal on the line 118 signifying the presence of a normal sweep by the display of a logic ONE signal. The latching means 164 is normally in the set state, providing a logic ONE on the line 154 at its Q output. If the enable logic ONE signal on the line 118 is present at the D input of the latching means 164 at the time of transition of the delayed signal on the line 162, the true output of the latching means on the line 154 will remain at a logic ONE level. The absence of a logic ONE signal on the line 118 at the transition of the signal on the line 162,
allows the signal on the line 162 to reset the latching means 164 causing the signal at its Q output on the line 154 to transition to a logic zero, inhibiting the gated video amplifier 34 by the process described hereinbefore.

While the preferred embodiment of the invention has been described in terms of a phosphor protection circuit for a stroke-write CRT display of alpha-numeric characters, it may equally well be used in television displays, and in any CRT display wherein it is deemed necessary to protect the phosphor coating from burn-out. Similarly, although the invention has been shown and described with respect to illustrative embodiments thereof, it should be understood by those skilled in the art that the foregoing and various other changes, omissions and additions in the form and detail thereof may be made therein without departing from the spirit and the scope of the invention.

Having thus described typical embodiments of our invention, that which we claim as new and desire to secure by Letters Patent of the United States is:

1. Apparatus for protecting against damage of a CRT phosphor screen which provides a visual image in response to video, horizontal sweep, and vertical sweep input signals in a system having a source of video signals, a source of horizontal sweep signal, and a source of vertical sweep signal, comprising:
 a gated video amplifier connected for response to the video source and having a gate signal input, said video amplifier selectively operable in response to a gating signal applied to said gate input to provide video signals to the CRT;
 means connected to the horizontal and vertical sweep signal sources for providing an enable signal in response to the presence of either of the sweep signals having a rate of change in excess of a given magnitude; and
 means connected for response to the source of video signals and to said enable signal, and having an output connected to said gate input, said output normally providing said gating signal to said video amplifier in response to the absence of video signals and in response to the concurrent presence of video signals and said enable signal, said output cutting off said gating signal within a determined time interval in response to the presence of video signals in the absence of a concurrent enable signal within said determined time interval, the duration of said determined time interval being less than that required for unswept video to damage the phosphor screen of the CRT in the absence of said enable signal.

2. Apparatus according to claim 1 wherein said enable signal providing means comprises:
 a pair of rate detection circuits, one for each of the sweep signals, each providing an output signal proportional to the rate of change of the related sweep signal;
 a pair of low pass filters, each connected to the output of a corresponding one of said rate detection circuits for providing filtering of the related sweep signal;
 a pair of window comparators, each connected to the output of a corresponding one of said filters, each comparator providing an output signal in response to the presence of filtered signals having a positive or negative magnitude in excess of a given magnitude;

an OR circuit connected to the output of both of said comparators for generating said enable signal in response to the presence of an output signal from either of said comparators; and wherein the duration of said determined time interval is greater than the sum of the delay times created by said rate detection circuits and said filters.

3. Apparatus according to claim 1 wherein said gating signal providing means comprises:

an operational amplifier having a biased noninverting input to normally cause said amplifier to provide said gating signal and having an inverting input connected to a capacitor;

means connected to the source of video signals for charging the capacitor to a voltage higher than the bias on said noninverting input within a time equal to said determined time interval, and in response to the presence of video signals in the absence of said enable signal; and means responsive to said enable signal for discharging the capacitor.

4. Apparatus according to claim 1 wherein said gating signal providing means comprises:

a bistable latch having a clocking input and having a level setting input connected for response to said enable signal; and means connected to said source of video signal for providing to said clocking input a transition signal delayed from the appearance of video signals at said source of video signals by a time equal to said determined time interval, said latch providing said gating signal when in a set condition, said transition signal setting said latch in concurrence with said enable signal and otherwise resetting said latch.

* * * * *